UNITED STATES PATENT OFFICE 2,493,747

ACID MEROCYANINE DYES

Leslie G. S. Brooker and Frank L. White, Rochester, N. Y., assignors to Eastman Kodak Company, Rochester, N. Y., a corporation of New Jersey No Drawing. Application July 16, 1945, Serial No. 605,472

14 Claims. (Cl. 260—240.4)

This invention relates to merocyanine dyes and more particularly to merocyanine dyes containing at least one acid group selected from the group consisting of sulfo (—$SO_3H$) and carboxyl (—COOH) groups, in the keto nucleus (i. e. the nucleus containing the carbonyl group of the auxo-chromophoric group).

Merocyanine dyes are characterized by containing a auxo-chromophore group consisting of a nitrogen atom (contained in a heterocyclic nucleus) linked by a conjugated chain of carbon atoms to the oxygen atom of a keto group, i. e. a carbonyl group. A number of merocyanine dyes are known, and generally speaking, these can be regarded as neutral substances with a tendency to exhibit basic properties. We have now found a new group of merocyanine dyes which are acidic and which behave in photographic silver halide emulsions, in some cases, in a different manner from the known merocyanine dyes.

Our new acidic merocyanine dyes contain in the keto nucleus at least one acid group selected from the group consisting of a sulfo group and a carboxyl group, and some of them sensitize photographic silver halide emulsions less strongly (at the same concentration) than do the known merocyanine dyes. In many cases, however, sensitization of a strength comparable to that of the known merocyanine dyes can be obtained by increasing the concentration of the acid merocyanine dye in the photographic silver halide emulsion. Our new dyes differ from the known merocyanine dyes in that our dyes leave less stain when sensitized materials containing them are processed.

It is, accordingly, an object of our invention to provide new merocyanine dyes. A further object is to provide a process for preparing such merocyanine dyes. A further object is to provide photographic silver halide emulsions sensitized with such dyes. Other objects will become apparent hereinafter.

Our new merocyanine dyes can be represented by the following general formula:

I.
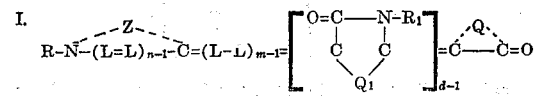

wherein R and $R_1$ each represents an alcohol radical (i. e. an alkyl group substituted or unsubstituted), e. g. methyl, ethyl, n-butyl, isobutyl, allyl, $\beta$-ethoxyethyl, $\beta$-hydroxyethyl, $\beta$-acetoxyethyl, carbethoxymethyl, $\beta$-phenylethyl or benzyl, or R represents an aryl group, e. g. phenyl, L represents a methine group substituted or unsubstituted, $n$ represents a positive integer of from 1 to 2, $m$ represents a positive integer of from 1 to 3, $d$ represents a positive integer of from 1 to 3, $Q_1$ represents an oxygen atom, a sulfur atom, or a group of the formula

wherein $R_3$ represents an alcohol radical (i. e. an alkyl group substituted or unsubstituted) or an aryl group, Q represents the non-metallic atoms necessary to complete a heterocyclic nucleus containing 5 atoms in the ring, e. g. a rhodanine nucleus, a 2-thio-2,4(3,5)-oxazoledione nucleus or a 5-pyrazolone nucleus etc., said heterocyclic nucleus containing at least one group selected from the group consisting of sulfo and carboxyl groups, and Z represents the non-metallic atoms necessary to complete a heterocyclic nucleus containing from 5 to 6 atoms in the heterocyclic ring, e. g. a nucleus of the benzothiazole series, a nucleus of the benzoxazole series, a nucleus of the benzoselenazole series, a nucleus of the $\alpha$-naphthothiazole series, a nucleus of the $\beta$-naphthothiazole series, a nucleus of the $\alpha$-naphthoxazole series, a nucleus of the $\beta$-naphthoxazole series, a nucleus of the $\alpha$-naphthoselenazole series, a nucleus of the $\beta$-naphthoselenazole series, a nucleus of the thiazoline series, a nucleus of the simple thiazole series (e. g. 4-methylthiazole, 4-(2-thienyl)thiazole, 4-phenylthiazole, etc.), a nucleus of the simple selenazole series (e. g. 4-methylselenazole, 4-phenylselenazole, etc.), a nucleus of the simple oxazole series (e. g. 4-methyloxazole, 4-phenyloxazole, etc.), a nucleus of the quinoline series, a nucleus of the pyridine series, a nucleus of the 3,3-dialkylindolenine series, etc.

In accordance with our invention, we prepare merocyanine dyes of the above general formula wherein $m$ represents 1 and $d$ represents 1 (i. e. simple merocyanines) by condensing a cyclammonium quaternary salt containing in the $\alpha$- or $\gamma$-position (i. e. one of the so-called reactive positions) a thioether group, e. g. an alkylthio, an aralkylthio or an arylthio group, or a halogen atom, e. g. a chlorine, a bromine or an iodine atom, with a heterocyclic compound containing 5 atoms in the ring and containing a keto-methylene (—CO—$CH_2$—) group in the ring and containing at least one group selected from the group consisting of sulfo and carboxyl groups. This condensation gives simple merocyanine dyes of the following general formula:

II.
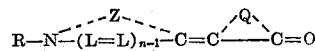

wherein R, L, $n$, Q and Z have the values set forth above.

The condensations are advantageously carried out in the presence of a basic condensing agent (i. e. an acid-binding agent) e. g. a tertiary amine, such as pyridine, a trialkylamine or a N-alkylpiperidine. Alkali metal carbonates or alkali metal alcoholates can also be employed. A reaction medium can be employed, e. g. a lower molecular weight alcohol, e. g. ethyl, n-propyl, isopropyl, n-butyl or isobutyl alcohol. Heat accelerates the condensations.

Simple merocyanine dyes of our invention containing a 4-quinoline nucleus can also be prepared by condensing a quinoline quaternary salt containing no substituent in the 4-position, with a heterocyclic compound containing in the heterocyclic ring a ketomethylene group, containing 5 atoms in the ring and containing at least one group selected from the group consisting of sulfo and carboxyl groups, in the presence of an alcoholic solution of an alkali metal hydroxide, e. g. potassium hydroxide. Alcohols of the formula $C_nH_{2n+1}OH$ wherein $n$ represents a positive integer of from 1 to 4 are advantageously employed.

In accordance with our invention, we prepare merocyanine dyes of the above general formula I wherein $m$ represents 2 and $d$ represents 1 (i. e. merocarbocyanines) by condensing a cyclammonium quaternary salt containing in the $\alpha$- or $\gamma$-position (i. e. one of the so-called reactive positions) a $\beta$-arylaminovinyl group, with a heterocyclic compound containing 5 atoms in the ring and containing a ketomethylene ($-CO-CH_2-$) group in the ring and containing at least one group selected from those consisting of sulfo and carboxyl groups. The $\beta$-arylaminovinyl group is advantageously an acylated $\beta$-arylaminovinyl group, e. g. a $\beta$-acetanilidovinyl group. This condensation gives merocarbocyanine dyes of the following general formula:

III.

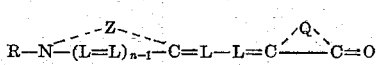

wherein R, L, $n$, Q and Z have the values given above.

The condensations are advantageously carried out in the presence of a basic condensing agent, e. g. a tertiary amine, such as a trimethylamine, triethylamine, dimethylaniline or a N-alkylpiperdine. A reaction medium is advantageously employed, e. g. pyridine, or a lower molecular weight alcohol, such as ethyl, n-propyl, isopropyl, n-butyl or isobutyl alcohol. An alkali metal carboxylate in a carboxylic anhydride can also be employed as basic condensing agent, e. g. sodium acetate in acetic anhydride. Heat accelerates the condensations.

The above merocarbocyanine dyes can also be prepared by condensing a cyclammonium quaternary salt containing, in the $\alpha$- or $\gamma$-position, a $-CH_2-R_4$ group wherein $R_4$ represents hydrogen, an alkyl group, an alkoxyl group or an aryloxyl group with an orthoester of a carboxylic acid, e. g. ethyl orthoformate, ethyl orthoacetate, ethyl orthopropionate, etc., and a heterocyclic compound containing 5 atoms in the ring and containing a ketomethylene ($-CO-CH_2-$) group in the ring and containing at least one group selected from the group consisting of sulfo and carboxyl groups. The condensations are advantageously carried out in the presence of a basic condensing agent, such as those recited above. A reaction medium of a lower molecular weight alcohol is advantageously employed.

The above merocarbocyanine dyes containing a substituent on the dimethine chain adjacent to the keto heterocyclic nucleus can also be prepared by condensing a cyclammonium quaternary salt containing, in the $\alpha$- or $\gamma$-position, a $\beta$-alkyl- (or aryl) -$\beta$-alkylmercaptovinyl group, with a heterocyclic compound containing 5 atoms in the ring and containing a ketomethylene ($-CO-CH_2-$) group in the ring and containing at least one group selected from the group consisting of sulfo and carboxyl groups. The condensations are advantageously carried out in the presence of a basic condensing agent, e. g. a trialkylamine, a N-alkylpiperidine or an alkali metal carbonate. A reaction medium of a lower molecular weight alcohol is advantageously employed.

In accordance with our invention, we prepare merocyanine dyes of the above general formula I wherein $m$ represents 3 and $d$ represents 1 (i. e. merodicarbocyanines) by condensing a cyclammonium quaternary salt containing, in the $\alpha$- or $\gamma$-position, a 4-arylamino-1,3-butadienyl group, with a heterocyclic compound containing 5 atoms in the ring and containing a ketomethylene ($-CO-CH_2-$) group in the heterocyclic ring and containing at least one group selected from the group consisting of sulfo and carboxyl groups. The 4-arylamino-1,3-butadienyl group is advantageously an acylated 4-arylamino-1,3-butadienyl group, e. g. a 4-acetanilido-1,3-butadienyl group. This condensation gives merodicarbocyanine dyes of the following general formula:

IV.

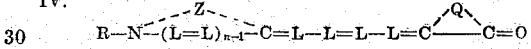

wherein R, L, $n$, Q and Z have the values set forth above.

The condensations to give merodicarbocyanine dyes are advantageously carried out in the presence of a basic condensing agent, e. g. a tertiary amine, such as trimethylamine, triethylamine, dimethylanidine or a N-alkylpiperidine. A reaction medium is advantageously employed, such as ethyl, n-propyl, isopropyl, n-butyl or isobutyl alcohol. An alkali metal carboxylate in a carbocylic anhydride can also be used as basic condensing agent, e. g. sodium acetate in acetic anhydride.

In accordance with our invention, we prepare merocyanine dyes of the above general Formula I, wherein $d$ represents 2 or 3 by treating a merocyanine dye of the following general formula:

V.

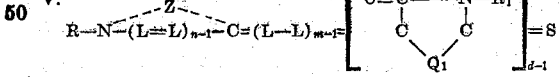

wherein R, L, $n$, $m$, $Q_1$, $R_1$ and Z have the values set forth above, and $d$ represents a positive integer of from 2 to 3, with an alkyl salt to obtain a quaternary alkylmercapto compound of the following general formula:

VI.

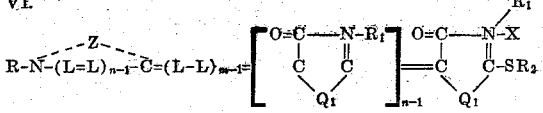

wherein R, L, $n$, $m$, $Q_1$, $R_1$ and Z have the values set forth above, and $R_2$ represents an alcohol radical (i. e. an alkyl group substituted or unsubstituted), $d$ represents a positive integer of from 1 to 2, and X represents an anion. We then condense the quaternary compound with a heterocyclic compound containing 5 atoms in the ring and containing in the ring a ketomethylene ($-CO-CH_2-$) group and containing at least one group selected from the group consisting of sulfo and carboxyl groups. This condensation gives complex merocyanine dyes of the following general formula:

VII.
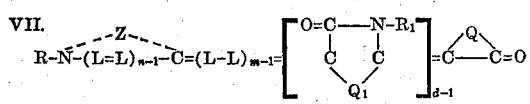

wherein R, L, $n$, $m$, $R_1$, $Q_1$, Q and Z have the values given above, $d$ represents a positive integer of from 2 to 3.

These condensations which give complex merocyanine dyes are advantageously carried out in the presence of a basic condensing agent, e. g. a trialkylamine, pyridine or a N-alkylpiperidine or an alkali metal carbonate, using a lower molecular weight alcohol as reaction medium.

The dyes of our invention which are represented by the following general formula are especially valuable substance for the sensitization of photographic silver halide emulsions:

VIII.
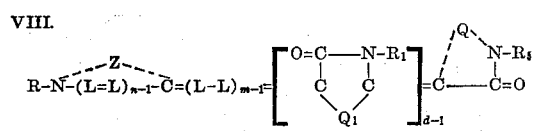

wherein R, L, $n$, $m$, $d$, $Q_1$, $R_1$ and Z have the values represented above, and $R_5$ represents a sulfoaryl or carboxyaryl group of the benzene series and Q represents the non-metallic atoms necessary to complete a rhodanine or a 2-thio-2,4(3,5)-oxazoledione nucleus. These dyes when employed alone in photographic silver halide emulsions are, generally speaking, good sensitizers. The dyes wherein Q in formula VIII represents the non-metallic atoms necessary to complete a 5-pyrazolone nucleus are not, generally speaking, as efficacious as sensitizers.

The following examples will serve to illustrate further our new dyes and the manner of obtaining the same.

*Example 1.—4-(3-ethyl-2(3)-benzothiazolylidene)-3-methyl-1-(p-sulfophenyl)-5-pyrazolone*

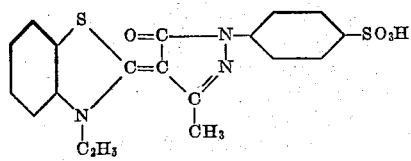

2.02 g. (2 mols.) of triethylamine were added to a suspension of 3.99 g. (1 mol.) of 2-phenylmercaptobenzothiazole ethiodide and 2.54 g. (1 mol.) of 3-methyl-1-(p-sulfophenyl)-5-pyrazolone in 25 cc. of ethyl alcohol, and the mixture was heated at the refluxing temperature for 20 minutes. An excess of hydrogen chloride, in methyl alcohol, was added to the cold reaction mixture. After chilling at 0° C., the dye was collected on a filter and washed with methyl alcohol. The yield of crude dye was 65 per cent. The dye was purified by dissolving its triethylamine salt in ethyl alcohol, filtering the solution and adding an excess of hydrogen chloride, in methyl alcohol, to the chilled filtrate. After chilling at 0° C., the dye was collected on a filter and washed with methyl alcohol. After a further purification the yield of dye was 51 per cent. The cream-colored crystals had a melting point of 325–327° C. with decomposition. This dye did not sensitize a photographic gelatina-silver-chlorobromide emulsion in the visual region of the spectrum.

*Example 2.—3-(p-carboxyphenyl)-5-(3-methyl-2(3)-benzoxazolylidene)-rhodanine*

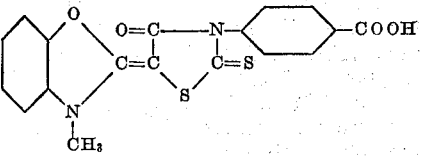

To crude 2-methylmercaptobenzoxazole metho-p-toluene-sulfonate, made by heating 1.65 g. (1 mol.) of 2-methylmercaptobenzoxazole and 1.86 g. (1 mol) of methyl p-toluenesulfonate together at about 95° C. for 3 hours, were added 2.53 g. (1 mol.) of 3-(p-carboxyphenyl)rhodanine, 10 cc. of ethyl alcohol and 2.02 g. (2 mols.) of triethylamine. The reaction mixture was heated at the refluxing temperature for 30 minutes, later concentrated, and the residue was treated with an excess of acetic acid. The solid was collected on the filter and washed with methyl alcohol. The yield of crude dye was 26 per cent. The dye was purified by dissolving its triethylamine salt in aqueous methyl alcohol and adding an excess of acetic acid to the chilled filtrate. After further chilling at 0° C., the dye was collected on a filter and washed with methyl alcohol. After another purification, the yield was 8 per cent. The light brown crystals had a melting point of 327–328° C. with decomposition and sensitized a photographic gelatino-silver-chlorobromide emulsion to about 490 mu. with maximum sensitivity to about 460 mu.

*Example 3.—4-[(5-chloro-3-ethyl-2(3)-benzothiazolylidene)-ethylidene]-3-methyl-1-(p-sulfophenyl)-5-pyrazolone*

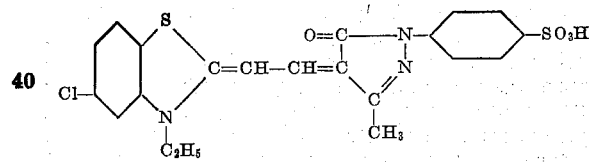

0.74 g. (1 mol.+5% excess) of triethylamine was added to the suspension of 3.40 g. (1 mol.) of 2-(2-acetanilidovinyl)-5-chlorobenzothiazole ethiodide and 1.78 g. (1 mol.) of 3-methyl-1-(p-sulfophenyl)-5-pyrazolone in 20 cc. of ethyl alcohol and the mixture was heated at the refluxing temperature for 20 minutes. After chilling at 0° C., the solid was collected on a filter and washed with methyl alcohol. The yield of crude dye was 66 per cent. The dye was purified by dissolving its pyridine salt in water, filtering the solution and adding an excess of concentrated hydrochloric acid to the filtrate. The dye was collected on a filter and washed with methyl alcohol. After a further purification, the yield of dye was 33 per cent. The brownish crystals had melting point about 315° C. and sensitized a photographic gelatino-silver-bromiodide emulsion to about 570 mu. with maximum sensitivity at about 525 mu.

*Example 4.—4-[(5-chloro-3-ethyl-2(3)-benzothiazolylidene)-α-ethylethylidene]-3-methyl-1-(p-sulfophenyl)-5-pyrazolone*

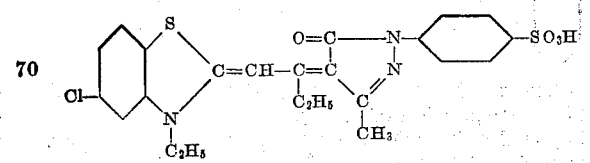

1.42 g. (1 mol.) of 5-chloro-3-ethyl-2-thiopropionyl-methylenebenzothiazoline and 0.93 g. (1 mol.) of methyl p-toluene-sulfonate were heated together at the temperature of the steam bath for about 5 hours. To this crude quaternary salt were added 1.27 g. (1 mol.) of 3-methyl-1-(p-sulfophenyl)-5-pyrazolone, 20 cc. of ethyl alcohol and 1.01 g. (2 mols.) of triethylamine. The mixture was heated at the refluxing temperature for 20 minutes. An excess of hydrogen chloride, dissolved in methyl alcohol, was added to the chilled mixture. The solid was collected on a filter and washed with methyl alcohol. The product was dissolved as the triethylamine salt in about 50 cc. of methyl alcohol and the solution was filtered. An excess of hydrogen chloride, dissolved in methyl alcohol, was added to the chilled filtrate. The product was collected on a filter and washed with methyl alcohol. After another purification, the yield of dye was 54 per cent and the orange-red crystals had a melting point of 294–296° C. with decomposition and sensitized a photographic gelatino-silver-bromiodide emulsion to about 560 mu. with maximum sensitivity at about 525 mu.

*Example 5.—4-[(3-ethyl-5-phenyl-2(3)-benzoxazolylidene)ethylidene]-3-methyl-1-(p-sulfophenyl)-5-pyrazolone*

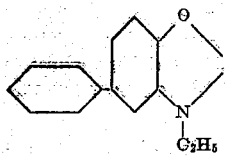

2.02 g. (2 mols.) of triethylamine was added to the suspension of 2.54 g. (1 mol.) of 3-methyl-1-(p-sulfophenyl)-5-pyrazolone and 5.10 g. (1 mol.) of 2-(β-acetanilidovinyl)-5-phenylbenzoxazole ethiodide in 25 cc. of ethyl alcohol and the mixture was heated at the refluxing temperature for 20 minutes. After chilling the reaction mixture, an excess of concentrated hydrochloric acid was added and the dye was collected on a filter and washed with methyl alcohol. The yield of crude dye was 76 per cent. The crude product was suspended in about 50 cc. of methyl alcohol and an excess of triethylamine was added. The suspension was filtered and the solid was washed on the filter with methyl alcohol. The filtrate was chilled and treated with an excess of concentrated hydrochloric acid. The dye was collected on the filter and washed with methyl alcohol. This portion was given another purification just as above. The yield of dye was 32 per cent. The yellow crystals had a melting point above 325° C. and sensitized a photographic gelatino-silver-chlorobromide emulsion to about 525 mu. with maximum sensitivity at about 490 mu.

*Example 6.—4-[(1-ethyl-2(1)-β-naphthothiazolylidene)ethylidene]-3-methyl-1-(p-sulfophenyl)-5-pyrazolone*

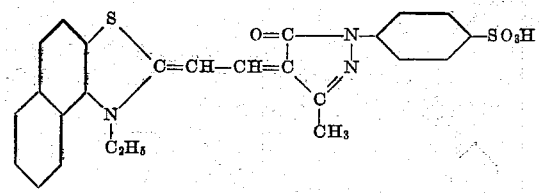

2.02 g. (2 mols.) of triethylamine was added to the suspension of 2.54 g. (1 mol.) of 3-methyl-1-(p-sulfophenyl)-5-pyrazolone and 5.44 g. (1 mol.) of 2-(2-acetanilidovinyl)-β-naphthothiazole etho-p-toluene-sulfonate in 25 cc. of ethyl alcohol and the mixture was heated at the refluxing temperature for 20 minutes. After chilling at 0° C., the solid was collected on the filter and it was washed with methyl alcohol. The yield of the crude dye-triethylamine salt was 81 per cent. This product was dissolved in aqueous methyl alcohol. The filtrate was treated with an excess of hydrogen chloride, dissolved in methyl alcohol. After chilling at 0°, the dye was washed on the filter with methyl alcohol. The residue was given a second purification as above. The dye was obtained in 53 per cent yield as yellowish orange crystals and had a melting point about 315° C. and sensitized a photographic gelatino-silver-bromiodide emulsion at about 590 mu. with maximum sensitivity at about 540 mu.

*Example 7.—4-[(1-ethyl-2(1)-β-naphthothiazolylidene)-α-phenyl-ethylidene]-3-methyl-1-(p-sulfophenyl)-5-pyrazolone*

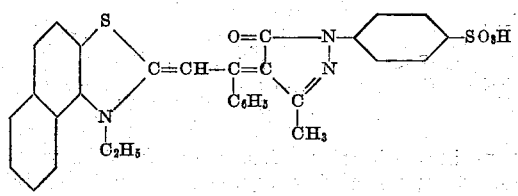

1.74 g. (1 mol.) of 1-ethyl-2-thiobenzoylmethylene-β-naphthothiazoline and 0.93 g. (1 mol.) of methyl-p-toluenesulfonate were heated together at the temperature of the steam bath for about 5 hours. To this crude quaternary salt were added 1.27 g. (1 mol.) of 3-methyl-1-(p-sulfophenyl)-5-pyrazolone, 20 cc. of ethyl alcohol and 1.01 g. (2 mols.) of triethylamine. The mixture was heated at the refluxing temperature for 20 minutes. An excess of hydrogen chloride, dissolved in methyl alcohol, was added to the chilled mixture. The solid was collected on a filter and washed with methyl alcohol. The product was dissolved as the triethylamine salt in methyl alcohol and the solution was filtered. An excess of hydrogen chloride, dissolved in methyl alcohol, was added to the chilled filtrate. The product was collected on a filter and washed with methyl alcohol. After another purification, the yield of dye was 39 per cent and the reddish orange crystals decomposed from about 285° C. The dye sensitized a photographic gelatino-silver-bromiodide emulsion to about 560 mu.

*Example 8.—3-methyl-1-(p-sulfophenyl)-4-[(1,3,3-trimethyl-2(1)-indolyidene)ethylidene]-5-pyrazolone*

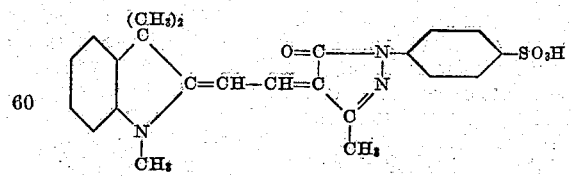

1.06 g. (1 mol.+5% excess) of triethylamine was added to the suspension of 4.46 g. (1 mol.) of 2-(2-acetanilidovinyl)-3,3-dimethylindolenine methiodide and 2.54 g. (1 mol.) of 3-methyl-1-(p-sulfophenyl)-5-pyrazolone in 25 cc. of ethyl alcohol and the mixture was heated at the refluxing temperature for 20 minutes. After chilling at 0° C., the solid was collected on a filter and washed with methyl alcohol. The yield of crude dye was 64 per cent. The dye was purified by dissolving its pyridine salt in water, filtering the solution and adding an excess of concentrate hydrochloric acid to the filtrate. The dye was collected on a filter and washed with methyl alcohol. After a further purification, the yield of dye was 50 per cent. The orange crystals had a melting point above 325° C. and sensitized a photographic gelatino-silver-bromiodide emulsion to about 560 mu. with maximum sensitivity at about 535 mu.

*Example 9.*—4 - [(1-ethyl-2(1)-quinolylidene)-ethylidene] - 3 - methyl - 1 - (p-sulfophenyl)-5-pyrazolone

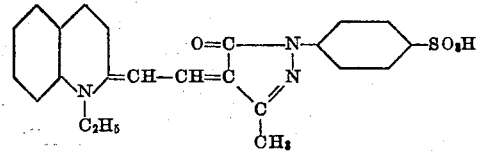

0.74 g. (1 mol.+5% excess) of triethylamine was added to the suspension of 1.78 g. (1 mol.) of 3-methyl-1(p-sulfophenyl)-5-pyrazolone and 3.11 g. (1 mol.) of 2-(2-acetanilidovinyl)-quinoline ethiodide in 20 cc. of ethyl alcohol and the mixture was heated at the refluxing temperature for 20 minutes. After chilling at 0° C., the solid was collected on the filter and washed with methyl alcohol. The yield of crude dye was 70 per cent. The crude dye was dissolved in water as the pyridine salt and the solution was filtered. An excess of concentrated hydrochloric acid was added to the chilled filtrate. After chilling at 0° C., the solid was collected on the filter and washed with methyl alcohol. The residue was dissolved in water as the pyridine salt and the solution was filtered. An excess of hydrogen chloride, dissolved in methyl alcohol, was added to the chilled filtrate. After chilling at 0° C., the dye was collected on the filter and washed with methyl alcohol. The yield of dye was 47 per cent. The light orange crystals had a melting point above 315° C. and sensitized a photographic gelatino-silver-bromiodide emulsion weakly to about 560 mu.

*Example 10.*—4 - [(1,6-dimethyl-2(1)-quinolylidene)ethylidene] - 3 - methyl - 1 - (p-sulfophenyl)-5-pyrazolone

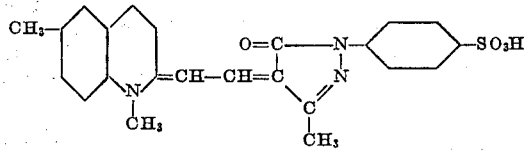

1.01 g. (2 mols.) of triethylamine was added to the suspension of 2.44 g. (1 mol.) of 2-(2-acetanilidovinyl) - 6 - methylquinoline metho-p-toluenesulfonate and 1.27 g. (1 mol.) of 3-methyl-1(p-sulfophenyl)-5-pyrazolone in 15 cc. of ethyl alcohol and the mixture was heated at the refluxing temperature for 20 minutes. An excess of hydrogen chloride, in methyl alcohol, was added to the cold reaction mixture. The solid was collected on a filter and washed with methyl alcohol. The dye was purified by dissolving its triethylamine salt in methyl alcohol and adding an excess of hydrogen chloride, in methyl alcohol, to the chilled filtrate. The dye was collected on a filter and washed with methyl alcohol. After a further purification, the yield of dye was 93 per cent. The dark brownish crystals had a melting point above 310° C. and sensitized a photographic gelatino-silver-bromiodide emulsion to about 580 mu.

*Example 11.*—4-[(1-ethyl-4(1)-quinolylidene)-ethylidene]-3-methyl - 1 - (p-sulfophenyl)-5-pyrazolone

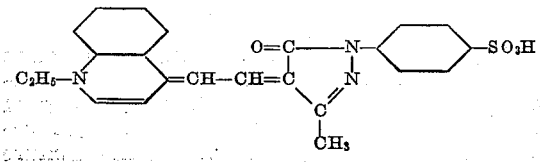

0.74 g. (1 mol.+5% excess) of triethylamine was added to the suspension of 1.78 g. (1 mol.) of 3-methyl-1-(p-sulfophenyl)-5-pyrazolone and 3.11 g. (1 mol.) of 4-(2-acetanilidovinyl)-quinoline ethiodide in 20 cc. of ethyl alcohol and the mixture was heated at the refluxing temperature for 20 minutes. After chilling at 0° C., the solid was collected on the filter and washed with methyl alcohol. The yield of crude product was 31 per cent. The crude dye was dissolved in water as the pyridine salt and the solution was filtered. An excess of concentrated hydrochloric acid was added to the chilled filtrate. After chilling at 0° C., the solid was collected on the filter and washed with methyl alcohol. The residue was dissolved in water as the pyridine salt and the solution was filtered. An excess of hydrogen chloride, dissolved in methyl alcohol, was added to the chilled filtrate. After chilling at 0° C., the dye was collected on the filter and washed with methyl alcohol. The yield of purified dye was 26 per cent. The reddish-orange crystals had a melting point above 315° C. and sensitized a photographic gelatino-silver-bromiodide emulsion to about 580 mu.

*Example 12.* — 4-[(3-ethyl-4-methyl-2(3)-thiazolylidene)ethylidene]-3-methyl-1-(p-sulfophenyl)-5-pyrazolone

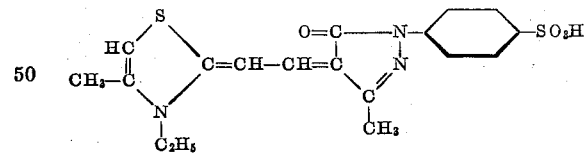

2.02 g. (2 mols.) of triethylamine was added to the suspension of 4.14 g. (1 mol.) 2-(2-acetanilidovinyl)-4-methyl-thiazole ethiodide and 2.54 g. (1 mol.) of 3-methyl-1-(p-sulfophenyl)-5-pyrazolone in 25 cc. of ethyl alcohol and the mixture was heated at the refluxing temperature for 20 minutes. An excess of hydrogen chloride, dissolved in methyl alcohol, was added to the chilled reaction mixture. The solid was collected on a filter and washed with methyl alcohol. The crude dye was dissolved in water as the pyridine salt and the solution was filtered. An excess of hydrogen chloride, dissolved in methyl alcohol, was added to the chilled filtrate. The dye was collected on a filter and washed with methyl alcohol. After another purification, the yield of dye was 89 per cent and the yellow crystals had a melting point above 315° C. and showed only a trace of sensitization to about 510 mu. in a gelatino-silver-chlorobromide emulsion.

*Example 13.— 3-methyl-4-[(3-methyl-2(3)-thiazolinylidene) - ethylidene]-1-(p-sulfophenyl)-5-pyrazolone*

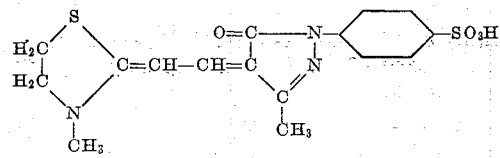

2.02 g. (2 mols.) of triethylamine was added to a suspension of 3.88 g. (1 mol.) of 2-(2-acetanilidovinyl) thiazoline methiodide and 2.54 g. (1 mol.) of 3-methyl-1-(p-sulfophenyl)-5-pyrazolone in 25 cc. of ethyl alcohol and the mixture was heated at the refluxing temperature for 20 minutes. After chilling at 0° C., the mixture was treated with an excess of hydrogen chloride, in methyl alcohol. The dye was collected on the filter and washed with methyl alcohol. The yield of crude dye was 92 per cent. The dye was purified by dissolving its pyridine salt in water, filtering the solution and adding an excess of hydrogen chloride, in methyl alcohol, to the filtrate. After a further purification the yield of dye was 75 per cent. The yellow solid had a melting point above 315° C. This dye slightly sensitized a photographic gelatino - silver - chlorobromide emulsion.

*Example 14.—1-(p-carboxyphenyl)-4-[(3-ethyl-2(3)-benzothiazolylidene) ethylidene]-3-methyl-5-pyrazolone*

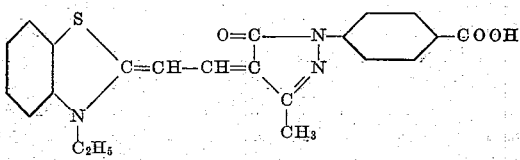

1.06 g. (1 mol.+5% excess) of triethylamine was added to the suspension of 2.18 g. (1 mol.) of 3-methyl-1-(p-carboxyphenyl)-5-pyrazolone and 4.50 g. (1 mol.) of 2-(2-acetanilidovinyl)-benzothiazole ethiodide in 35 cc. of ethyl alcohol and the mixture was heated at the refluxing temperature for 20 minutes. After chilling at 0° C., the solid was collected on a filter and washed with methyl alcohol. The residue was stirred with 150 cc. of boiling methyl alcohol and filtered hot. The yield of crude dye was 80 per cent. The dye was purified by dissolving its triethylamine salt in aqueous methyl alcohol and adding an excess of hydrogen chloride, in methyl alcohol, to the chilled filtrate. After chilling at 0° C., the dye was collected on a filter and washed with methyl alcohol. After a further purification, the yield of dye was 60 per cent. The orange crystals had melting point above 315° C. and sensitized a photographic gelatino-silver-bromiodide emulsion to about 565 mu. with maximum sensitivity at about 525 mu.

*Example 15.—1-(p-carboxyphenyl)-4-[(3-ethyl-2(3) - benzothiazolylidene)-isopropylidene]-3-methyl-5-pyrazolone*

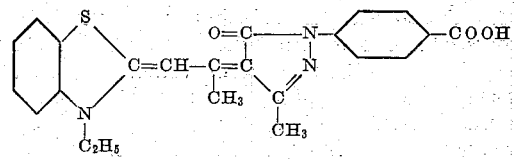

1.01 g. (2 mols.) of triethylamine was added to the suspension of 2.10 g. (1 mol.) of 2-(2-methylmercaptopropenyl)-benzothiazole etho-p-toluenesulfonate and 1.09 g. (1 mol.) of 1-(p-carboxyphenyl)-3-methyl-5-pyrazolone in 20 cc. of ethyl alcohol and the reaction mixture was heated at the refluxing temperature for 30 minutes. The cold mixture was stirred with ether and the dye salt was collected on the filter and washed with ether. The residue was stirred with methyl alcohol and an excess of piperidine. The solution was filtered and an excess of hydrogen chloride, in methyl alcohol, was added to the chilled filtrate. After further chilling at 0° C., the dye was collected on a filter and washed with methyl alcohol. The residue was further purified by dissolving its piperidine salt in methyl alcohol, filtering and adding an excess of hydrogen chloride, in methyl alcohol, to the chilled filtrate. The dye was washed on the filter with methyl alcohol. After another purification, the yield of dye was 83 per cent. The brownish-yellow crystals had a melting point of 289–290° C., with decomposition and sensitized a photographic gelatino-silver-bromiodide emulsion to about 565 mu. with maximum sensitivity at about 520 mu.

*Example 16.—4-[(3-ethyl - 2(3) - benzothiazolylidene) ethylidene] - 3-methyl - 1-(4-sulfo-1-naphthyl)-5-pyrazolone*

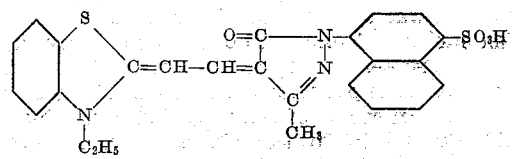

0.51 g. (1 mol.) of triethylamine was added to the suspension of 2.25 g. (1 mol.) of 2-(2-acetanilidovinyl)-benzothiazole ethiodide and 1.63 g. (1 mol.) of the sodium salt of 1-(4-sulfo-1-naphthyl)-3-methyl-5-pyrazolone in 20 cc. of ethyl alcohol and the mixture was heated at the refluxing temperature for 30 minutes. The cold reaction mixture was stirred with ether, and the solid was collected on a filter and washed with ethyl alcohol. The residue was suspended in methyl alcohol and then an excess of piperidine was added. The piperidine salt of the dye dissolved readily in cold methyl alcohol. After filtering, the chilled filtrate was treated with an excess of hydrogen chloride, in methyl alcohol, and the whole chilled at 0° C. The dye was collected on a filter and washed with methyl alcohol. After another purification, the yield of dye was 34 per cent. The light brownish crystals had melting point above 310° C. and sensitized a photographic gelatino-silver-bromiodide emulsion to about 540 mu.

*Example 17.—4-[(3 - ethyl-2(3) - benzothiazolylidene) isopropylidene]-3 - methyl-1-(p-sulfophenyl)-5-pyrazolone*

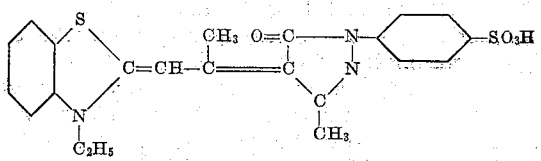

This dye was prepared by using 1 mol. of 2-(2-methylmercaptopropenyl)-benzothiazole etho-p-toluenesulfonate instead of the addition product of 5-chloro-3-ethyl-2 - thiopropionylmethylene-benzothiazoline and methyl-p-toluenesulfonate, employed in Example 4. The deep yellow crystals had a melting point above 315° C. and sensitized a photographic gelatino-silver-bromiodide emulsion to about 570 mu. with maximum sensitivity at about 520 mu.

*Example 18.—4-[(1-ethyl-2(1)-β-naphthothiazolylidene)isopropylidene]-3-methyl-1-(p-sulfophenyl)-5-pyrazolone.*

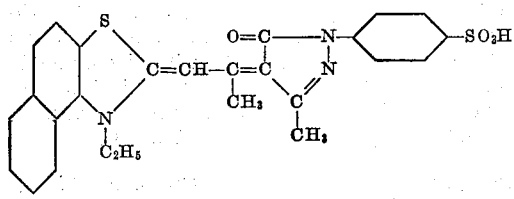

This dye was prepared in a 51 per cent yield by using 1.43 g. (1 mol.) of 1-ethyl-2-thioacetylmethylene-β-naphthothiazoline in place of the 1-ethyl-2 - thiobenzoylmethylene-β - naphthothiazoline employed in Example 7. The dull yellow crystals had a melting point above 300° C. with decomposition from about 295° C. This dye sensitized a photographic gelatino-silver-bromiodide emulsion to about 570 mu. with maximum sensitivity at about 530 mu.

*Example 19.—3-(p-carboxyphenyl)-5-[(3-ethyl-2(3) - benzothiazolylidene) - ethylidene]rhodanine*

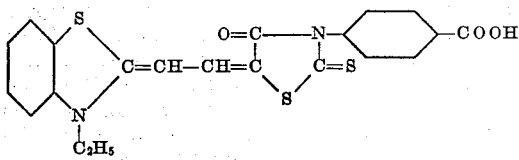

1.01 g. (2 mols.) of triethylamine was added to a suspension of 2.25 g. (1 mol.) of 2-(2-acetanilidovinyl)benzothiazole ethiodide and 1.1 g. (1 mol.) of 3-(p-carboxyphenyl) rhodanine in 25 cc. of ethyl alcohol and the reaction mixture was heated at the refluxing temperature for 30 minutes. The chilled mixture was treated with an excess of acetic acid. After chilling at 0° C., the dye was collected on the filter and washed with water. The yield of crude product was 82 per cent. The dye was purified by dissolving its triethylamine salt in methyl alcohol and adding an excess of acetic acid to the chilled filtrate. After chilling at 0° C., the dye was washed on the filter with methyl alcohol. After a further purification, the yield of dye was 55 per cent. The red plates had a melting point of above 300° C. and sensitized a photographic gelatino-silver-bromiodide emulsion to about 650 mu. with maximum sensitivity at about 590 mu.

*Example 20.—3-(3-carboxy-4-hydroxyphenyl)-5-[(3 - ethyl-2(3) - benzothiazolylidene) ethylidene]rhodanine, pyridine salt*

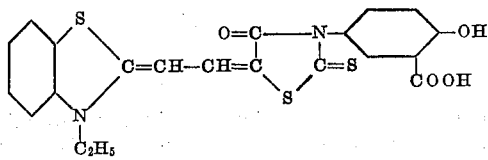

1.0 g. (2 mols.) of triethylamine was added to a suspension of 2.25 g. (1 mol.) of 2-(2-acetanilidovinyl)-benzothiazole ethiodide and 1.35 g. (1 mol.) of 3-(3-carboxy-4-hydroxyphenyl)rhodanine in 35 cc. of ethyl alcohol and the reaction mixture was heated at the refluxing temperature for 30 minutes. An excess of concentrated hydrochloric acid was added to the cold mixture. After chilling at 0° C., the dye was collected on a filter and washed with methyl alcohol. The yield of dye was equal to the theoretical (crude) and 45 per cent after two recrystallizations from pyridine plus methyl alcohol. The red crystals of the pyridine salt of the dye had a melting point of 277–279° C. with decomposition and sensitized a photographic gelatino-silver-bromiodide emulsion to about 640 mu. with maximum sensitivity at about 590 mu.

*Example 21.—5-[(3-ethyl-2(3)-benzothiazolylidene)isopropylidene]-3-(p-sulfophenyl)rhodanine*

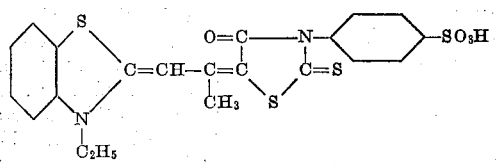

2 - (2 - methylmercaptopropenyl)benzothiazole etho-p-toluenesulfonate was made by heating 1.2 g. of 3-ethyl-2-thioacetylmethylenebenzothiazoline and 1.43 g. of methyl p-toluenesulfonate together at the temperature of the steam bath for 2 hours. To this crude product were added 1.5 g. of 3-(p-sulfophenyl)rhodanine, 50 cc. of ethyl alcohol and 1.01 g. of triethylamine. The mixture was heated at the refluxing temperature for 30 minutes. After chilling at 0° C., the solid was collected on the filter and washed with ethyl alcohol. The crude dye mixture (2.3 g.) was extracted with seven 200 cc. portions of hot methyl alcohol and the remaining residue was rejected. The yield of dye from all of the extracts was 37 per cent and 20 per cent after another recrystallization from methyl alcohol. The purple crystals had a melting point of above 320° C. and sensitized a photographic gelatino-silver-bromiodide emulsion to about 655 mu. with maximum sensitivity at about 585 mu.

*Example 22.—5-[(3-ethyl-2(3)-benzothiazolylidene)ethylidene] - 3-(2,5-disulfophenyl)rhodanine*

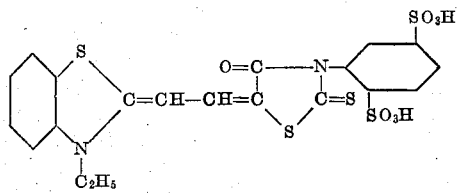

1.5 g. (3 mols.) of triethylamine was added to the suspension of 2.25 g. (1 mol.) of 2-(2-acetanilidovinyl)benzothiazole ethiodide and 1.85 g. (1 mol.) of 3-(2,5-disulfophenyl) rhodanine in 100 cc. of ethyl alcohol and the reaction mixture was heated at the refluxing temperature for 30 minutes. The mixture was chilled and treated with 3 cc. of concentrated hydrochloric acid. After chilling at 0° C., the dye was collected on a filter and washed with ethyl alcohol. The yield of dye was 78 per cent crude and 29 per cent after two recrystallizations from methyl alcohol (100 cc. per gram of dye). The green crystals had a melting point of 204–206° C. with decomposition and sensitized a photographic gelatino-silver-bromiodide emulsion to about 635 mu. with maximum sensitivity at about 590 mu.

*Example 23.* — *3-(p-carboxyphenyl)-5-[(3-ethyl-2(3)-benzoxazolylidene)ethylidene]-rhodanine*

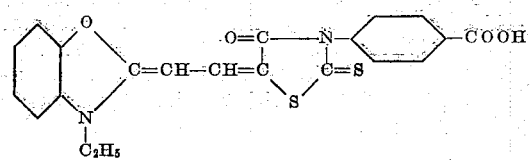

1.01 g. (2 mols.) of triethylamine was added to a suspension of 2.2 g. (1 mol.) of 2-(2-acetanilidovinyl)benzoxazole ethiodide and 1.1 g. (1 mol.) of 3-(p-carboxyphenyl)rhodanine in 25 cc. of ethyl alcohol and the reaction mixture was heated at the refluxing temperature for 30 minutes. An excess of acetic acid was added to the chilled mixture. After chilling at 0° C., the solid was collected on the filter and washed with water. The yield of crude dye was 71 per cent. The dye was purified by dissolving its triethylamine salt in ethyl alcohol and adding an excess of acetic acid to the chilled filtrate. After chilling at 0° C., the dye was collected on the filter and washed with ethyl alcohol. After a further purification, the yield of dye was 64 per cent. The minute orange plates had a melting point of above 300° C., and sensitized a photographic gelatino-silver-bromiodide emulsion to about 615 mu. with maximum sensitivity at about 560 mu.

*Example 24.*—*5[(3-ethyl-2(3)-benzoxazolylidene)ethylidene]-3-(p-sulfophenyl)rhodanine*

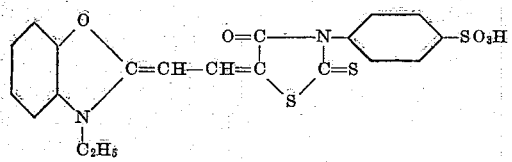

1.01 g. of triethylamine was added to a suspension of 1.5 g. of 3-(p-sulfophenyl)rhodanine and 2.2 g. of 2-(2-acetanilidovinyl)benzoxazole ethiodide in 50 cc. of ethyl alcohol and the reaction mixture was heated at the refluxing temperature for 30 minutes. After chilling at 0° C., the solid was collected on the filter and washed with ethyl alcohol. The residue (1.7 g.) was extracted with hot ethyl alcohol. The yield of dye obtained from this extract was 30 per cent. After another recrystallization from methyl alcohol, the yield of dye was 9 per cent. The red crystals had a melting point above 320° C. and sensitized a photographic gelatino-silver-bromiodide emulsion to about 620 mu. with maximum sensitivity at about 560 mu.

*Example 25.* — *5-[(3-ethyl-2(3)-benzoxazolylidene)ethylidene] - 3 - (p - sulfophenyl) - 2-thio-2,4(3,5)-oxazoledione*

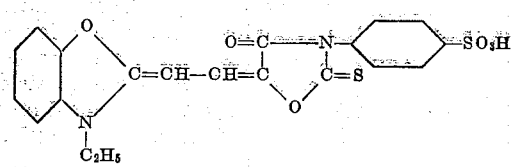

1.0 g. (2 mols.) of triethylamine was added to the suspension of 1.4 g. (1 mol.) of 3-(p-sulfophenyl)-2-thio-2,4(3,5)-oxazoledione and 2.2 g. (1 mol.) of 2-(2-acetanilidovinyl)benzoxazole ethiodide in 30 cc. of ethyl alcohol and the reaction mixture was heated at the refluxing temperature for 15 minutes. After chilling at 0° C., the dye was collected on the filter and washed with water. The yield of dye was 32 per cent crude and 6 per cent after two recrystallizations from methyl alcohol. The orange crystals had a melting point of 235–237° C. with decomposition and sensitized a photographic gelatino-silver-chlorobromide emulsion to about 565 mu. with maximum sensitivity at about 525 mu.

*Example 26.* — *4-[(3-ethyl-2(3)-benzothiazolylidene)-2-butenylidene]-3-methyl-1-(p-sulfophenyl)-5-pyrazolone*

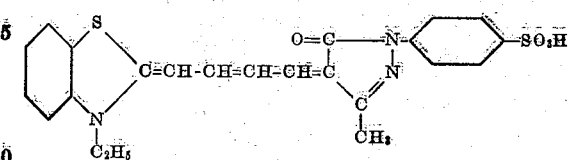

0.51 g. (1 mol.) of triethylamine was added to a suspension of 2.38 g. (1 mol.) of 2-(4-acetanilido-1,3-butadienyl)-benzothiazole ethiodide and 1.27 g. (1 mol.) of 3-methyl-1-(p-sulfophenyl)-5-pyrazolone in 10 cc. of dry pyridine and the mixture was heated at the refluxing temperature for 5 minutes. The cool reaction mixture was stirred with 250 cc. of ether. After chilling at 0° C., the ether layer was decanted, the sticky residue was stirred with a fresh portion of ether. After decanting the ether, the residue was dissolved in methyl alcohol and an excess of acetic acid was added. After chilling at 0° C., the solid was collected on the funnel and washed with methyl alcohol. The crude product was extracted with successive portions of boiling methyl alcohol in order to remove the blue dye. The yield of crude dye was 43 per cent. The dye was purified by dissolving its triethylamine salt in methyl alcohol, filtering the solution and adding an excess of acetic acid to the chilled filtrate. After chilling at 0° C., the dye was collected on a filter and washed with methyl alcohol. After a further purification the yield of dye was 24 per cent. The dark green crystals had a melting point of 279–280° C. with decomposition and sensitized a photographic gelatino-silver-bromiodide emulsion weakly to about 700 mu. with maximum sensitivity at about 630 mu.

*Example 27.*—*3-(p-carboxyphenyl)-5-[(3-ethyl-2(3) - benzoxazolylidene) - 2 - butenylidene]-rhodanine*

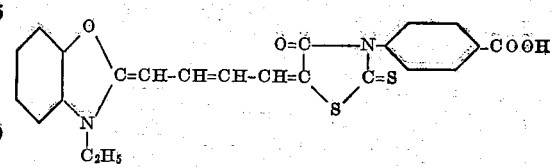

0.51 g. (1 mol.) of triethylamine was added to the suspension of 1.27 g. (1 mol.) of 3-(p-carboxyphenyl)rhodanine and 2.30 g. (1 mol.) of 2-(4 - acetanilido - 1,3 - butadienyl)benzoxazole ethiodide in 15 cc. of pyridine and the mixture was heated at the refluxing temperature for 10 minutes. The cool mixture was stirred with 300 cc. of ether and the whole chilled at 0° C. The solid was collected on a filter and washed with ether. The residue was dissolved in methyl alcohol and an excess of acetic acid was added. After chilling at 0° C., the solid was washed on the filter with methyl alcohol. The yield of crude dye was 35 per cent. The dye was purified by dissolving its triethylamine salt in methyl alcohol (60 cc.) and adding an excess of acetic acid to the chilled filtrate. After further chilling, the dye was washed on the filter with methyl alcohol. After another purification, the yield was 22 per cent. The purplish crystals had a melting point of 232–234° C. with decomposition and sensitized a photographic gelatino-silver-bromiodide emulsion from about 570 mu. to about 670 mu. with maximum sensitivity at about 645 mu.

*Example 28.* — *3-ethyl-5-[(3-ethyl-2(3)-benzoxazolylidene)ethylidene] - 2 - [3 - methyl - 5- oxo - 1 - (p - sulfophenyl) - 4 - (2 - pyrazolinylidene)]-4-thiazolidone*

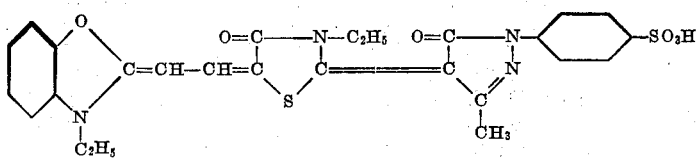

1.73 g. (1 mol.) of 5-[(3-ethyl-2(3)-benzoxazolylidene)ethylidene] - 2 - methylmercapto-4-thiazolone etho-p-toluenesulfonate and 0.85 g. (1 mol.) of 3-methyl-1-(p-sulfophenyl)-5-pyrazolone were heated together in 10 cc. of pyridine at the refluxing temperature for 7 minutes. The cool reaction mixture was stirred with ether and the whole chilled at 0° C. The ether layer was decanted and the sticky mass was washed with fresh ether. The residue was treated with an excess of hydrogen chloride, in methyl alcohol, and the whole chilled at 0° C. The crude product was collected on a filter and washed with methyl alcohol. The residue was stirred with several successive portions of methyl alcohol. The yield of crude dye was 49 per cent. The dye was purified by dissolving its triethylamine salt in ethyl alcohol, filtering the solution and adding an excess of hydrogen chloride, in methyl alcohol. After chilling at 0° C., the solid was collected on a filter and washed with methyl alcohol. After a further purification, the yield of dye was 24 per cent. The blackish crystalline powder had a melting point of 311–312° C. with decomposition and showed a trace of sensitization in a gelatino-silver-bromiodide emulsion to about 550 mu. with maximum sensitivity at about 510 mu.

*Example 29.*—*3-ethyl - 5[(3-ethyl-2(3)-benzothiazolylidene)-ethylidene]-2-[3-methyl-5-oxo-1- (p-sulfophenyl) - 4 -(2 - pyrazolinylidene)]-4- thiazolidone*

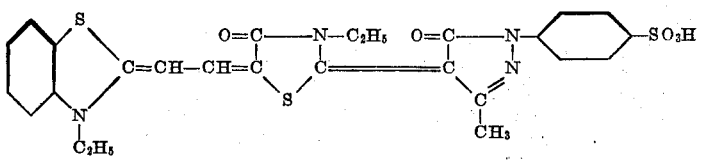

1.63 g. (1 mol.) of 5-[(3-ethyl-2(3)-benzothiazolylidene)-ethylidene]-2 - methylmercapto - 4-thiazolone ethiodide and 0.85 g. (1 mol.) of 3-methyl-1-(p-sulfophenyl)-5-pyrazolone were heated together in 10 cc. of pyridine at the refluxing temperature for 7 minutes. The cool reaction mixture was stirred with 200 cc. of ether and the whole chilled at 0° C. The solid was collected on a filter and washed with ether. The residue was transferred to a beaker and it was treated with an excess of hydrogen chloride, in methyl alcohol. After chilling at 0° C., the dye was collected on a filter and washed with methyl alcohol. The yield of crude dye was 87 per cent. The dye was purified by dissolving its triethylamine salt in ethyl alcohol, filtering the solution and adding an excess of hydrogen chloride, in methyl alcohol, to the chilled filtrate. After chilling at 0° C., the dye was collected on a filter and washed with methyl alcohol. After a further purification, the yield of dye was 53 per cent. The dark green crystals had a melting point of 287–288° C. with decomposition and sensitized a photographic gelatino-silver-bromiodide emulsion to about 635 mu. with maximum sensitivity at about 600 mu.

*Example 30.*—*2-[3-(p-carboxyphenyl)-4-oxo - 2 - thiono - 5 - thiazolidylidene] - 3 - ethyl - 5-[(3- ethyl - 2(3) - benzoxazolylidene)ethylidene]-4- thiazolidone*

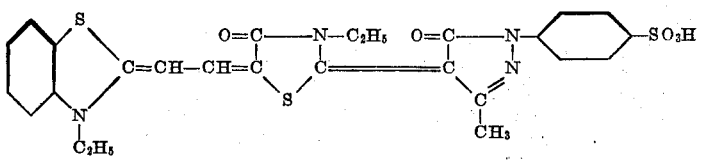

2.59 g. (1 mol.) of 5-[(3-ethyl-2(3)-benzoxazolylidene)ethylidene]-2 - methylmercapto - 4 - thiazolone etho-p-toluenesulfonate and 1.27 g. (1 mol.) of 3-(p-carboxyphenyl)rhodanine were heated together in 25 cc. of pyridine at the refluxing temperature for 10 minutes. The cool reaction mixture was stirred with ether and the solid was collected on the filter and washed with acetone. The yield of dye was 29 per cent crude and 22 per cent after two recrystallizations from pyridine (170 cc. per gram of dye). The dark red crystals with a green reflex had a melting point of above 340° C. and sensitized a photographic gelatino-silver-bromiodide emulsion from about 530 mu. to about 650 mu. with maximum sensitivity at about 610 mu.

In a manner similar to that illustrated in the foregoing examples, dyes containing 4-phenylthiazole, α-naphthothiazole, benzoselenazole, 4-methylselenazole, 4-phenylselenazole, α-naphthoselenazole, β-naphthoselenazole, 4-methyloxazole, 4-phenyloxazole, α-naphthoxazole, β-naphthoxazole, and pyridine (2- or 4-) nuclei can be prepared. Thus, in Examples 1 and 2, 2-phenylmercaptobenzothiazole ethiodide and 2-methylmercaptobenzoxazole metho - p-toluenesulfonate can be replaced with a molecularly equivalent amount of 5-chloro-2-ethylmercaptobenzothiazole ethiodide, with a molecularly equivalent amount of 2-phenylmercaptobenzothiazole β-ethoxyethobromide, with a molecularly equivalent amount of 2-iodoquinoline ethiodide, with a molecularly equivalent amount of 2-phenylmercaptopyridine ethiodide, with a molecularly equivalent amount of 2 - methylmercapto - β - naphthoselenazole metho-p-toluenesulfonate, etc. In Example 3, 2-(2-acetanilidovinyl)-5-chlorobenzothiazole ethiodide can be replaced with molecularly equivalent amounts of 2-(2-acetanilidovinyl)-benzoselenazole ethiodide, 2-(2-acetanilidovinyl)-α-naphthothiazole etho-p-toluenesulfonate, 2-(2-acetanilidovinyl)-4-phenylthiazole methiodide, with 2-(2-acetanilidovinyl)-4-phenylselenazole methiodide, with 2 - (2 -acetanilidovinyl) - β - naphthoxazole ethiodide, etc. In Example 4, 5-chloro-3-ethyl-2-thiopropionylmethylenebenzothiazoline can be replaced with molecularly equivalent amounts of 1-ethyl-2 - thioacetylmethylene - β - naphthothiazoline, 3 - methyl - 2 - thiopropionylmethylene-benzoselenazoline, 3-ethyl-4-phenyl-2-thioacetylmethylene-4-thiazoline, etc. In Examples 14, 16 and 17, 2-(2-acetanilidovinyl) benzothiazole ethiodide can be replaced with molecularly equivalent amounts of any of the acetanilidovinyl compounds employed in Examples 4, 5, 6, 8, 9, 10, 11, 12 and 13 or 2-(2-acetanilidovinyl) benzoselenazole ethiodide, etc. In Examples 19 and 23, the 2-(2-acetanilidovinyl)-benzothiazole ethiodide or 2-(2-acetanilidovinyl)-benzoxazole ethiodide can be replaced with molecularly equivalent amounts of the acetanilidovinyl compounds employed in Examples 4, 5, 6, 8, 9, 10, 11, 12 and 13 or 2-(2-acetanilidovinyl benzoselenazole ethiodide, etc. In Examples 20 and 22, the 2-(2-acetanilidovinyl)benzothiazole ethiodide can be replaced with any of the acetanilidovinyl compounds employed in Examples 4, 5, 6, 8, 9, 10, 11, 12 and 13, or 2-(2-acetanilidovinyl)benzoselenazole ethiodide, etc. In Example 25, the 2-(2-acetanilidovinyl)benzoxazole ethiodide can be replaced with molecularly equivalent amounts of any of the acetanilidovinyl compounds employed in Examples 4, 5, 6, 8, 9, 10, 11, 12 and 13 or 2-(2-acetanilidovinyl)benzoselenazole ethiodide, etc. In Example 26, the 2-(4-acetanilido-1,3-butadienyl)- benzothiazole ethiodide can be replaced with molecularly equivalent amounts of 2-(4-acetanilido-1,3-butadienyl)benzoxazole ethiodide, 2-(4-acetanilido-1,3-butadienyl)benzoselenazole ethiodide, 2-(4-acetanilido-1,3-butadienyl)-4-phenylthiazole ethiodide, 4-(4-acetanilido-1,3-butadienyl)quinoline ethiodide, etc. In Example 27, the 2-(4-acetanilido-1,3-butadienyl)-benzoxazole ethiodide can be replaced with molecularly equivalent amounts of 2-(4-acetanilido-1,3-butadienyl)benzothiazole ethiodide, 2-(4-acetanilido-1,3-butadienyl)benzoselenazole ethiodide, 2-(4-acetanilido - 1,3 - butadienyl)-4-phenylthiazole ethiodide, 4-(4-acetanilido-1,3-butadienyl)-quinoline ethiodide, etc. In Examples 15, 18 and 21, the 3-ethyl-2-thioacetylmethylenebenzothiazoline can be replaced with a molecularly equivalent amount of 2-cyclopropylthioformylmethylene-3-ethylbenzothiazoline, prepared by condensing 2-methylbenzothiazole etho-p-toluenesulfonate with cyclopropane carboxylic acid chloride, in the presence of pyridine, in the cold, followed by treatment of the resulting ketone with phosphorus oxychloride, followed by treatment of the resulting β-chlorovinyl compound with thioacetamide (see the copending application of Leslie G. S. Brooker and Grafton H. Keyes, Serial No. 515,978, filed December 28, 1943, now Patent No. 2,441,529, May 11, 1948), or by 1-ethyl-2-thio-acetyl-methylene-1,2-dihydroquinoline, prepared by condensing quinaldine etho-p-toluenesulfonate with methyl dithioacetate, in the presence of triethylamine (see the copending application of Grafton H. Keyes, Serial No. 478,007, now abandoned, filed March 4, 1943). In Examples 28, 29 and 30, 5-[(3-ethyl-2(3)-benzoxazolylidene)ethylidene]-2-methylmercapto-4-thiazolone etho-p-toluenesulfonate and 5 - [(3-ethyl-2(3) - benzothiazolylidene)ethylidene] - 2 - methylmercapto-4-thiazolone ethiodide can be replaced by molecularly equivalent amounts of quaternary salts formed by addition of methyl-p-toluenesulfonate to any of the following merocyanine dyes in the manner described in British Patent 489,335, accepted July 22, 1938: 3-ethyl-5-(3-ethyl-2(3)-benzoxazolylidene) rhodanine, 3-ethyl-5-(1-ethyl-2(1)-quinolylidene) rhodanine, 3-ethyl-5-(3-ethyl-2(3) -benzothiazolylidene) rhodanine, 5-(3-ethyl-2,3-benzothiazolylidene) - 1,3-diphenyl-2-thiohydantoin, 3-ethyl-5-(1-ethyl-2(1)-β-naphthoxazolylidene) rhodanine, 5-[(3-ethyl-2(3)-benzoxazolylidene) ethylidene] - 3 - phenylrhodanine, 5-[(3-ethyl-2(3)-benzoxazolylidene)ethylidene]-1,3-diphenyl-2-thiohydantoin, 5 - [(3-ethyl-β-carbethoxyethyl-2(3) - benzothiazolylidene)ethylidene]-3-carbethoxymethylrhodanine, 5-[(3-ethyl-2(3)-benzothiazolylidene)ethylidene] - 3 - methylrhodanine, 3-ethyl-5-[(1-ethyl-2(1)-β-naphthothiazolylidene) ethylidene]rhodanine, 5-[(5-chloro-3-ethyl-2(3) - benzothiazolylidene) isopropylidene]-3-ethylrhodanine, 5-(3-ethyl-2(3)-benzothiazolylidene) - 3-ethyl-2 - (3-ethyl-4-oxo-2-thiono-5-thiazolidylidene-4-thiazolidone, 5-[(3-ethyl-2(3)-benzoxazolylidene) ethylidene] - 1,3 - diphenyl-2-(3-ethyl-2-thiono-4-oxo - 5 - thiazolidylidene - 4-imidazolidone, 3-ethyl - 5 - [(3-ethyl-2(3)-benzothiazolylidene) isopropylidene] - 2 - (3 - ethyl - 4-oxo-2-thiono-5-thiazolidylidene) - 4-oxazolidone, etc. See also the copending application of Leslie G. S. Brooker, Serial No. 316,002, filed January 27, 1940, now Patent No. 2,454,629, November 23, 1948. 2 - (β-acetanilidovinyl) - benzothiazole ethiodide was condensed with 1-(p-sulfophenyl)-5-pyrazolone to give 3-carboxy-4-[(3-ethyl-2(3)-benzothiazolylidene)ethylidene] - 1-(p-sulfophenyl)-5-pyrazolone (dark red crystals melting at 251 to 252° C. with decomposition). 2-(2-methylmercaptopropenyl)-benzothiazole etho-p-toluenesulfonate was condensed with 3-carboxy-1-phenyl-5-pyrazolone to give 3-carboxy-4-[(3-ethyl-2(3)-benzothiazolylidene) isopropylidene] - 1-phenyl-5-pyrazolone (orange crystals melting at 217 to 218° C. with decomposition).

The following examples illustrate the preparation of ketomethylene compounds containing sulfoaryl or carboxyaryl groups.

*Example 31.—3-(p-sulfophenyl) - 2-thio-2,4(3,5)-oxazoledione*

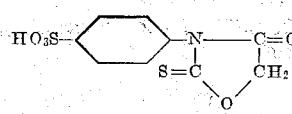

17.3 g. of sulfanilic acid was added to a cold solution of 6.1 g. of potassium hydroxide (85 per cent) in 30 cc. of water. To this solution was added 10.5 g. of acetanidocarbothiolon-glycolic acid,

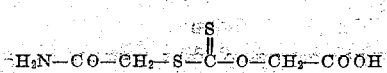

Ahlquist, J. prakt. Chem., 11, 99; 45 (1919). After standing about 16 hours, the mixture was made

Example 32.—3-(p-carboxyphenyl)rhodanine

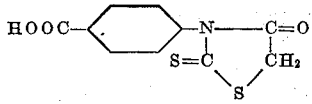

13.7 g. (1 mol.) of p-aminobenzoic acid was suspended in 100 cc. of water and sodium carbonate was added until the resulting solution was neutral to litmus paper. To this solution was added 22.6 g. (1 mol.) of di(carboxymethyl)trithiocarbonate and the reaction mixture was heated at the temperature of the steam bath for about 16 hours. After chilling, the mixture was made acid to Congo red paper with dilute sulfuric acid and the whole further chilled at 0° C. The product was collected on a filter, washed with cold water and then air dried. The yield was 96 per cent.

Example 33.—3-(3-carboxy-4-hydroxyphenyl)-rhodanine

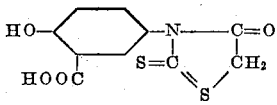

19.0 g. (1 mol.) of 5-aminosalicylic acid hydrochloride was dissolved in 100 cc. of water and 10.6 g. of sodium carbonate added slowly. To this neutral solution was added 22.6 g. (1 mol.) of di(carboxymethyl)trithiocarbonate and the reaction mixture was heated at the temperature of the steam bath for about 16 hours. After chilling, the mixture was made acid to Congo red paper with dilute sulfuric acid and the whole further chilled at 0° C. The product was collected on a filter, washed with cold water and air dried. The yield was 80 per cent.

Example 34.—3-methyl-1-(4-sulfo-1-naphthyl)-5-pyrazolone, sodium salt

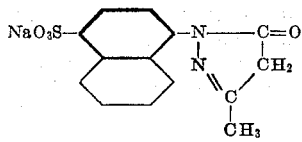

6.5 g. of 1-hydrazinonaphthylene 4-sulfonic acid [Erdmann, Ann. 247, 333 (1888)], 3.5 g. ethyl acetoacetate and 2.3 g. of sodium acetate were heated together in 200 cc. of 50 per cent ethyl alcohol at the refluxing temperature for 18 hours. The mixture was concentrated to about 50 cc. After chilling, the product was collected on a filter and then recrystallized from dilute alcohol. The yield was 5.5 g.

Example 35.—3-(2,5-disulfophenyl)rhodanine

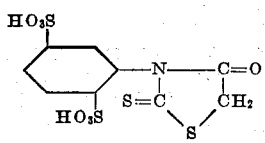

31.8 g. (1 mol.) of 40 per cent 1-aminobenzene-2,5-disulfonic acid was suspended in 100 cc. of water and 5.3 g. of sodium carbonate was added slowly. To this neutral solution was added 7 g. (1 mol.) of di(carboxymethyl)trithiocarbonate and the reaction mixture was heated at the temperature of the steam bath for 24 hours. After chilling, the mixture was made acid to Congo red paper with dilute sulfuric acid and the whole chilled at 0° C. Filtered and concentrated the filtrate to about ½ the original volume. The residue was chilled at 0° C. The product was collected on a filter, washed with cold water and air dried. The yield was 50 per cent.

Example 36.—3-(p-sulfophenyl)rhodanine

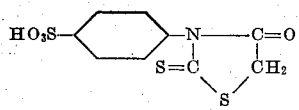

8.6 g. (1 mol.) of sulfanilic acid was suspended in 75 cc. of water and sodium carbonate (about 2.8 g.) was added until the resulting solution was neutral to litmus paper. To this solution was added 11.3 g. (1 mol.) of di(carboxymethyl)-trithiocarbonate and the reaction mixture was heated at the temperature of the steam bath for 16 hours. After chilling, the mixture was treated with 5 cc. of concentrated sulfuric acid and the whole chilled at 0° C. The product was collected on a filter and washed with cold water. The yield of 3-(p-sulfophenyl)rhodanine was 62 per cent. The pale yellow crystals had melting point above 300° C.

The di(carboxymethyl)trithiocarbonate employed above was prepared as follows:

A mixture of 908 g. of crystalline sodium sulfide, about 2 l. of water and 287.5 g. of carbon disulfide were stirred mechanically, under reflux, for 16 hours. An aqueous solution of 715 g. of chloroacetic acid was neutralized with sodium carbonate and the resulting solution was added to the above mixture and the whole was stirred for 3 hours. After making acid to Congo red paper with dilute sulfuric acid, the reaction mixture was chilled at 0° C. The product was collected on a filter, washed with cold water and then air dried. The yield was 57 per cent.

3-methyl-1-(p-sulfophenyl)-5-pyrazolone and 3-methyl-1-(p-carboxyphenyl)-5-pyrazolone are known substances.

In the preparation of photographic silver halide emulsions containing the acid merocyanine dyes, it is only necessary to disperse the dyes in the emulsions. Ordinarily this is advantageously accomplished by forming a water-soluble salt of the acid merocyanine dye and dissolving the water-soluble salt in water, methanol or ethanol, or a mixture of water and methanol and ethanol, and dispersing the resulting solution in the emulsion. The salts are advantageously formed by adding to the acid merocyanine dye, wet with a little water, methanol or ethanol, to an alkali metal hydroxide, e. g. sodium or potassium hydroxide, or ammonium hydroxide, or an amine, e. g. methylamine, ethylamine, dimethylamine, diethylamine, trimethylamine, triethylamine, ethanolamine, diethanolamine, triethanolamine, pyridine, N-methylpiperidine, n-propylamine, isopropylamine, butylamine, β-ethoxyethylamine, etc., and taking up the salt which forms in a suitable solvent, e. g. water, methanol, ethanol, a mixture of water and methanol, a mixture of water and ethanol, etc.

Sensitization by means of our new acid merocyanine dyes is primarily directed to the ordinarily employed gelatino-silver-halide developing-out emulsions, e. g. gelatino-silver-chloride, -chlorobromide, -chlorobromiodide, -bromide and -bromiodide developing-out emulsions. The acid dyes or their salts are advantageously added to the washed, finished emulsions and should of course, be uniformly distributed throughout the emulsions.

The concentration of these compounds in the emulsion can vary widely, e. g. from about 5 to about 100 mg. per liter of flowable emulsion. The concentration of the dye will vary according to the type of light-sensitive material and according to the effects desired. The suitable and most economical concentration for any given emulsion will be apparent to those skilled in the art, upon making the ordinary tests and observations customarily used in the art of emulsion making. To prepare a gelatino-silver-halide emulsion sensitized with one of our new dyes, the following procedure is satisfactory: a quantity of the dye in salt form is dissolved in water, methyl alcohol, ethyl alcohol, a mixture of methyl alcohol and water or a mixture of ethyl alcohol and water, and a volume of the solution containing from 5 to 100 mg. of dye is slowly added to about 1000 cc. of a gelatino-silver-halide emulsion with stirring. Stirring is continued until the dye is uniformly dispersed. With the more powerful of our new sensitizing dyes, 10 to 50 mg. of dye per 1000 cc. of emulsion suffice to produce the maximum sensitizing effect with the ordinary gelatino-silver-halide emulsions. The above statements are only illustrative and are not to be understood as limiting our invention in any sense, as it will be apparent that our new dyes can be incorporated by other methods in many of the photographic emulsions customarily employed in the art, such, for instance, as by bathing a plate or film upon which an emulsion is coated, in a solution of the dye (or its salt form) in an appropriate solvent, although such a method is ordinarily not to be preferred. The emulsion claims are intended to cover any combination of these new dyes with a photographic silver halide emulsion whereby the dyes exert a sensitizing effect on the emulsion.

In the processes for preparing dyes described above, the heterocyclic compound containing the ketomethylene group and containing 5 atoms in the heterocyclic ring and containing a sulfo and/or a carboxy group can be employed in its metal or ammonium salt form. Actually, in the foregoing examples where the condensations are carried out in the presence of a basic condensing agent, the basic condensing agent is partially used up in forming the metal or ammonium salt of the heterocyclic compound containing the ketomethylene group. For this reason one molecular proportion of the basic condensing agent for each molecular proportion of ketomethylene compound plus one molecular proportion of basic condensing agent for each carboxy group or sulfo group present, is employed.

The herein-described dyes are also useful in the preparation of optical filters useful for photographic purposes.

What we claim as our invention and desire to be secured by Letters Patent of the United States is:

1. The merocyanine dyes represented by the following general formula:

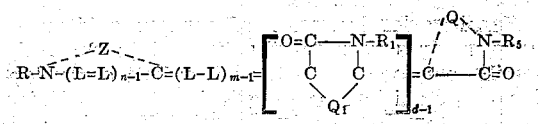

wherein R and $R_1$ each represents a member selected from the group consisting of an alkyl group having the formula $C_mH_{2m+1}$ wherein $m$ represents a positive integer from 1 to 4 and a phenyl group, L represents a methine group, $n$ represents a positive integer of from 1 to 2, $m$ represents a positive integer of from 1 to 3, $d$ represents a positive integer of from 1 to 3, Q represents the non-metallic atoms necessary to complete a heterocyclic nucleus containing five atoms in the heterocyclic ring, three of said atoms beings carbon atoms, one of said atoms being a nitrogen atom and the other of said atoms being selected from the group consisting of an oxygen atom, a sulfur atom, and a nitrogen atom, $R_5$ represents a carboxyaryl group of the benzene series and the alkali metal and ammonium salt forms of these groups and containing 5 atoms in the heterocyclic ring, $Q_1$ represents a member selected from the group consisting of an oxygen atom, a sulfur atom, and a group of the formula

wherein $R_3$ represents a member selected from the group consisting of an alkyl radical and an aryl group, and Z represents the non-metallic atoms necessary to complete a heterocyclic nucleus selected from the group consisting of those of the benzothiazole series, the benzoxazole series, the benzoselenazole series the α-naphthotiazole series, the β-naphthothiazole series, the α-naphthoxazole series, the β-naphthoxazole series, the α-naphthoselenazole series, the β-naphthoselanazole series, the thiazoline series, the thiazole series, the selenazole series, the oxazole series, the quinoline series, the pyridine series and the 3,3-dialkylindolenine series.

2. The merocarbocyanine dyes which are represented by the following general formula:

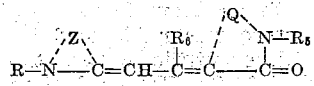

wherein R represents an alkyl group of the formula $C_nH_{2n+1}$ wherein $n$ represents a positive integer of from 1 to 4, $R_6$ represents an alkyl group of the formula $C_nH_{2n+1}$ wherein $n'$ represents a positive integer of from 1 to 2, Z represents the non-metallic atoms necessary to complete a heterocyclic nucleus of the benzoxazole series, Q represents the non-metallic atoms necessary to complete a rhodanine nucleus and $R_5$ represents a carboxyaryl group of the benzene series.

3. The merocarbocyanine dyes which are represented by the following general formula:

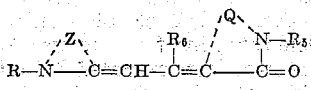

wherein R represents an alkyl group of the formula $C_nH_{2n+1}$ wherein $n$ represents a positive integer of from 1 to 4, $R_6$ represents an alkyl group of the formula $C_nH_{2n+1}$ wherein $n$ represents a positive integer of from 1 to 2, Z represents the non-metallic atoms necessary to complete a heterocyclic nucleus of the benzoxazole series, Q represents the non-metallic atoms necessary to complete a 2-thio-2,4(3,5)-oxazoledione nucleus and $R_5$ represents a carboxyaryl group of the benzene series.

4. The merocarbocyanine dyes which are represented by the following general formula:

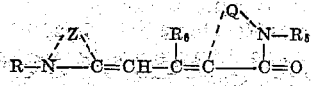

wherein R represents an alkyl group of the formula $C_nH_{2n+1}$ wherein $n$ represents a positive integer of from 1 to 4, $R_6$ represents an alkyl group of the formula $C_nH_{2n+1}$ wherein $n$ represents a positive integer of from 1 to 2, Z represents the non-metallic atoms necessary to complete a heterocyclic nucleus of the benzothiazole series, Q represents the non-metallic atoms necessary to complete a 5-pyrazolone nucleus and $R_5$ represents a carboxyaryl group of the benzene series.

5. The merocarbocyanine dye represented by the following formula:

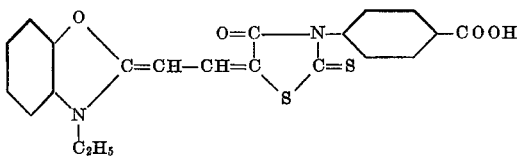

6. The merocarbocyanine dye represented by the following formula:

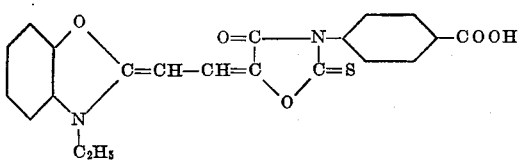

7. The merocarbocyanine dye represented by the following formula:

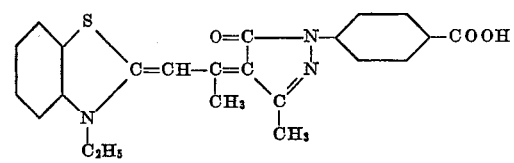

8. A process for preparing a merocyanine dye comprising condensing, in the presence of a basic condensing agent, a cyclammonium quaternary salt containing in a position selected from the group consisting of α- and γ-positions a group selected from the group consisting of a halogen atom, a thioether group, a β-arylaminovinyl group and a 4-arylamino-1,3-butadienyl group, with a heterocyclic compound containing a ketomethylene group in the heterocyclic ring, said ketomethylene compound containing 5 atoms in the heterocyclic ring, three of said atoms being carbon atoms, one of said atoms being a nitrogen atom and the other of said atoms being selected from the group consisting of an oxygen atom, a sulfur atom, and a nitrogen atom, and containing at least one carboxyaryl group of the benzene series and the alkali metal and ammonium salt forms of these groups.

9. A process for preparing a merocyanine dye comprising condensing, in the presence of a basic condensing agent, a cyclammonium quaternary salt containing a thioether group in the α-position, with a heterocyclic compound containing a rhodanine nucleus, said rhodanine nucleus containing at least one carboxyaryl group of the benzene series.

10. A process for preparing a merocyanine dye comprising condensing, in the presence of a basic condensing agent, a cyclammonium quaternary salt containing a β-arylaminovinyl in the α-position, with a heterocyclic compound containing a 2-thio-2,4(3,5)-oxazoledione nucleus, said 2-thio-2,4(3,5)-oxazoledione nucleus containing at least one carboxyaryl group of the benzene series.

11. A process for preparing a merocyanine dye comprising condensing, in the presence of a basic condensing agent, a cyclammonium quaternary salt containing a thioether group in the α-position, with a heterocyclic compound containing a 5-pyrazolone nucleus, said 5-pyrazolone nucleus containing at least one carboxyaryl group of the benzene series.

12. A process for preparing a merocyanine dye comprising condensing, in the presence of a basic condensing agent, a benzoxazole quaternary salt containing a thioether group in the α-position, with a heterocyclic compound containing a rhodanine nucleus, said rhodanine nucleus containing at least one carboxyaryl group of the benzene series.

13. A process for preparing a merocyanine dye comprising condensing, in the presence of a basic condensing agent, a benzoxazole quaternary salt containing a β-arylaminovinyl in the α-position, with a heterocyclic compound containing a 2-thio-2,4(3,5)-oxazoledione nucleus, said 2-thio-2,4-(3,5)-oxazoledione nucleus containing at least one carboxylaryl group of the benzene series.

14. A process for preparing a merocyanine dye comprising condensing, in the presence of a basic condensing agent, a benzothiazole quaternary salt containing a thioether group in the α-position, with a heterocyclic compound containing a 5-pyrazolone nucleus, said 5-pyrazolone nucleus containing at least one carboxyaryl group of the benzene series.

LESLIE G. S. BROOKER.
FRANK L. WHITE.

REFERENCES CITED

The following references are of record in the file of this patent:

UNITED STATES PATENTS

| Number | Name | Date |
|---|---|---|
| 2,032,502 | Rodd | Mar. 3, 1936 |
| 2,108,484 | Hamer | Feb. 15, 1938 |
| 2,108,845 | Brooker | Feb. 22, 1938 |
| 2,170,805 | Brooker | Aug. 29, 1939 |
| 2,265,908 | Kendall | Dec. 9, 1941 |
| 2,274,782 | Gaspar | Mar. 3, 1942 |
| 2,276,554 | Wilmans | Mar. 17, 1942 |
| 2,332,433 | Brooker | Oct. 19, 1943 |

FOREIGN PATENTS

| Number | Country | Date |
|---|---|---|
| 487,051 | Great Britain | 1938 |
| 218,381 | Switzerland | 1942 |

Certificate of Correction

Patent No. 2,493,747                             January 10, 1950

LESLIE G. S. BROOKER ET AL.

It is hereby certified that errors appear in the printed specification of the above numbered patent requiring correction as follows:

Column 21, lines 28 to 30, inclusive, for that portion of the formula reading

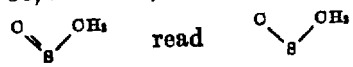

column 24, line 9, for the syllable "ings" read *ing*; line 15, after "groups" insert a comma; lines 15 and 16 strike out "and containing 5 atoms in the heterocyclic ring,"; line 28, for "tiazole" read *thiazole*; line 31, for "β-naphthoselanazole" read *β-naphthoselenazole*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*